US008279845B2

(12) United States Patent
Tan et al.

(10) Patent No.: US 8,279,845 B2
(45) Date of Patent: Oct. 2, 2012

(54) METHOD AND SYSTEM FOR REALIZING RECEPTION OF CALLING NUMBER BY THE TERMINAL IN ADVANCE

(75) Inventors: Ying Tan, Shenzhen (CN); Tianzhen Huang, Shenzhen (CN); Shikui Guo, Shenzhen (CN); Yongjian Mou, Shenzhen (CN); Shoubo Xie, Shenzhen (CN); Sihong Zhou, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 815 days.

(21) Appl. No.: 11/570,117

(22) PCT Filed: Aug. 1, 2005

(86) PCT No.: PCT/CN2005/001172
§ 371 (c)(1),
(2), (4) Date: Nov. 8, 2007

(87) PCT Pub. No.: WO2006/010344
PCT Pub. Date: Feb. 2, 2006

(65) Prior Publication Data
US 2008/0070498 A1 Mar. 20, 2008

(30) Foreign Application Priority Data
Jul. 30, 2004 (CN) .......................... 2004 1 0070221

(51) Int. Cl.
*H04B 7/216* (2006.01)
(52) U.S. Cl. ........ 370/342; 370/335; 455/415; 455/458; 455/432.1; 455/464
(58) Field of Classification Search .................. 455/415, 455/432.1, 464, 458
See application file for complete search history.

(56) References Cited

U.S. PATENT DOCUMENTS
5,745,695 A * 4/1998 Gilchrist et al. .............. 709/227
(Continued)

FOREIGN PATENT DOCUMENTS
CN 1142308 A 2/1997
(Continued)

OTHER PUBLICATIONS
International Search Report for PCT/CN2005/001172, mailed Nov. 10, 2005.
(Continued)

*Primary Examiner* — Jinsong Hu
*Assistant Examiner* — Qun Shen
(74) *Attorney, Agent, or Firm* — Finnegan, Henderson, Farabow, Garrett & Dunner LLP

(57) ABSTRACT

A system for realizing the reception of a incoming call number by a terminal includes a CDMA network and a HRPD network providing service support for the terminal, respectively, where an MSC in the CDMA network connects with an access network of the HRPD network via interface A1. A method for realizing the reception of a incoming call number by a terminal in advance includes: the MSC in the CDMA network transmitting the incoming call number of a paging to the access network of the HRPD network through interface A1; the access network forwarding the incoming call number of this paging to the called terminal; the called user deciding whether to accept the incoming call based on the received incoming call number. Accordingly, the switching between HRPD and CDMA2000 1x can be avoided when the user decides not to accept the incoming call.

7 Claims, 2 Drawing Sheets

U.S. PATENT DOCUMENTS

| | | | | |
|---|---|---|---|---|
| 5,826,173 | A | 10/1998 | Dent | |
| 6,795,541 | B2 * | 9/2004 | Oren | 379/207.08 |
| 6,961,329 | B1 * | 11/2005 | Bender et al. | 370/342 |
| 7,336,951 | B2 * | 2/2008 | Choi et al. | 455/436 |
| 7,570,617 | B2 * | 8/2009 | Kil et al. | 370/331 |
| 2002/0154627 | A1 * | 10/2002 | Abrol et al. | 370/352 |
| 2003/0083080 | A1 | 5/2003 | Fournier et al. | |
| 2005/0215245 | A1 * | 9/2005 | Tian et al. | 455/422.1 |
| 2006/0003772 | A1 * | 1/2006 | Semper | 455/452.1 |
| 2008/0070498 | A1 | 3/2008 | Tan et al. | |

FOREIGN PATENT DOCUMENTS

| | | |
|---|---|---|
| CN | 1436430 A | 8/2003 |
| CN | 1728841 A | 2/2006 |
| CN | 1805603 A | 7/2006 |
| CN | 1301023 C | 2/2007 |
| EP | 0624966 | 6/2002 |
| KR | 2002/0066712 | 8/2002 |
| KR | 2003/0002964 | 1/2003 |
| KR | 2003/0050864 | 6/2003 |
| WO | WO 01/97545 A2 | 12/2001 |

OTHER PUBLICATIONS

Written Opinion of the International Searching Authority (translation) dated (mailed) Nov. 10, 2005, issued in related Application No. PCT/CN2005/001172, filed Aug. 1, 2005, Huawei Technologies Co., Ltd.

3$^{rd}$ Generation Partnership Project 2, "Interoperability Skpecification (IOS) for High Rate Packet Data (HRPD) Radio Access Network Interfaces with Session Control in the Access Network," 3GPP2 A.S0008-B v1.0, Oct. 2006.

TIA/EIA Standard TDMA Third Generation Wireless Digital contol Channel layer 3 ANSI TIA-EIA-136-123-C Apr. 23, 2001.

Request for Invalidation of Patent Right of Chinese Application No. 200410070221.2, dated Dec. 15, 2011.

Second Canadian Office Action, dated Jul. 6, 2011, in reference to Canadian Patent Application No. 2,568,709, Huawei Technologies Co. Ltd. (3 pgs.)

* cited by examiner

METHOD AND SYSTEM FOR REALIZING RECEPTION OF CALLING NUMBER BY THE TERMINAL IN ADVANCE

CROSS REFERENCES TO RELATED APPLICATIONS

This application is the national phase of International Application No. PCT/CN2005/001172, which was filed on Aug. 1, 2005, and which, in turn, claimed the benefit of Chinese Patent Application No. 200410070221.2, which was filed on Jul. 30, 2004, the entire disclosures of which are hereby incorporated by reference.

FIELD OF THE INVENTION

The present invention relates to the technology of receiving signaling which is transmitted from a Code Division Multiple Access (CDMA) 2000 system by a terminal in the High Rate Packet Data (HRPD) Service Network (or referred to as Data Only (DO)), and more particularly, to a system and a method for realizing reception of a incoming call number from a CDMA2000 system by a terminal which is in an activation status of HRPD Service Network.

BACKGROUND OF THE INVENTION

In accordance with the Third Generation Partnership Project 2 (3GPP2) standards, the CDMA2000 1x network and HRPD network are independent from each other, and there is no interface between the two networks except that both of them can be connected to one Packet Data Service Network (PDSN). A terminal (Mobile Station/Access Terminal (MS/AT)) supporting both the CDMA2000 and the HRPD) can only stay in one network at a given time, that is, in the CDMA2000 network or in the HRPD network. In order to monitor the paging message or system message from the network which MS/AT do not stay in, MS/AT has to be scheduled to switch to the network which MS/AT do not stay in, according to the paging cycle of the network which MS/AT do not stay in, to monitor the paging message or system message.

FIG. 1 is a schematic illustrating the network structures of a CDMA2000 and a HRPD. As shown in FIG. 1, the CDMA2000 includes Base Station Subsystem (BSS) 101 covering the cell where MS/AT 100 is, Mobile service Switching Center (MSC) 102 covering the location area where the MS/AT is, and Home Location Register (HLR) 103 storing the location information of MS/AT. A Packet Control Fashion (PCF) is integrated with BSS 101, which is referred to as BSS/PCF 101. BSS/PCF 101 is connected with PDSN 104. The HRPD includes HRPD Access Network (AN) 105 for accessing a packet data service by MS/AT 100. HRPD AN 105 is integrated with a PCF, which is referred to as HRPD AN/PCF 105. HRPD AN/PCF 105 is connected with PDSN 104. The HRPD also includes Authentication Network server Authentication, Authorization, Accounting, (AN AAA) 106 connecting with HRPD AN/PCF 105 for authenticating MS/AT 100. In addition, PDSN includes AAA 107 which connects with PSDN for authenticating MS/AN 100.

At present, there are two schemes for realizing the reception of the voice paging and incoming call number from a CDMA system in a HRPD terminal.

The first scheme is described as follows: if MS/AT is a double-mode terminal having dual receivers, while HRPD is transmitting the packet data, MS/AT monitors the paging channel of CDMA2000 1x and judges whether there is voice paging message for itself or not, if there is, MS/AT responds to the paging of CDMA2000 1x, and sets tip a traffic channel in CDMA2000 1x; otherwise, MS/AT continues the current data service.

The process of MS/AT switching from HRPD to CDMA2000 1x, setting up the traffic channel and receiving the incoming call is as follows: the HRPD network switches MS/AT from the mode of receiving a packet data service to the mode of HRPD Dormant, and then switches the terminal to CDMA2000 1x to respond the paging request and set up a traffic channel; then CDMA2000 network transmits the incoming call number via the established traffic channel, waits for the MS/AT to make a response of whether accepting this incoming call or not. If the user chooses to accept the incoming call CDMA2000 1x network side accepts this call. If the user chooses not to accept the incoming call, CDMA2000 1x switches MS/AT back to HRPD Dormant and re-activates the packet data service for the MS/AT.

The second scheme is described as follows: if the MS/AT which stays in HRPD has a single receiver or a single transmitter, in order to receive the voice paging message of CDMA2000 1x, MS/AT must be periodically switched to CDMA2000 1x in accordance with the paging cycle of CDMA2000 1x, and monitor the voice paging message in the paging channel of CDMA2000 1x. If there is a voice paging message, MS/AT responds to the paging of CDMA2000 1x, and sets up the traffic channel in CDMA2000 1x; CDMA2000 1x transmits the incoming call number to MS/AT so that the user can decide whether to accept the incoming call. If there is no voice paging message or the user decides not to accept the incoming call, the MS/AT switches back to HRPD, and continues the current data service.

In order to prevent an MS/AT from frequently switching between two networks in the second scheme, the function of forwarding CDMA2000 1x messages via HRPD is added to the air interface of HRPD standard network, such as the function of forwarding a paging message, short message and system message. However, the A interface can not support the function, and there is no solution at present. This forwarding function prevents an MS/AT with single receiver or single transmitter from switching frequently between two networks in order to receive a paging message of CDMA2000 1x, that is, MS/AT with single receiver or single transmitter can stay in HRPD, and receive a paging message from CDMA2000 1x network via HRPD.

It can be realized that MS/AT need not frequently search between two networks by adopting double receivers or by forwarding the paging message of 1x network via HRPD network. However, as the incoming call number can not be sent until CDMA2000 1x has set up the traffic channel, even if the user does not intend to accept the incoming call with the incoming call number transmitted via the traffic channel, MS/AT have to switch to CDMA2000 1x first, set up a traffic channel, and then obtain the incoming call number transmitted via the established traffic channel, afterward the user has to determine not to accept to this coming call.

As the switching time between CDMA2000 1x and HRPD is long, those packet data services having a high requirement on real time operation, such as Voice of Internet Protocol (VoIP), Push to Talk (PTT), Video Phone and stream media services, may have been interrupted during the process of switching, which seriously influences the reception and transmission of packet data services for MS/AT.

SUMMARY OF THE INVENTION

The invention is to provide a system for realizing the reception of a incoming call number by a terminal in advance, and this system can enable an MS/AT in HRPD to obtain the incoming call number of the paging earlier.

The invention also provides a method for realizing the reception of a incoming call number by a terminal in advance, which can avoid the switching, between HRPD and CDMA2000 1x when the user of MS/AT does not intend to accept the coming call.

The invention provides a system for realizing the reception of a incoming call number by a terminal, this system includes a Code Division Multiple Access (CDMA) network and a High Rate Packet Data (HRPD) service network which provide service Support for the terminal, respectively;

wherein a Mobile service Switching Center (MSC) in the CDMA network connects with an access network in the HRPD network via an interface A1; and the interface A1 is used to transmit the incoming call number from the MSC to the access network when a calling terminal of the CDMA network initiates a paging to a called terminal in the HRPD network.

Wherein, location area information of terminals of the HRPD network is stored in the MSC of the CDMA network.

The interface A1 is further used to transmit the response message of the called terminal after having received the incoming call number from the access network to the MSC.

The CDMA network is a CDMA2000 1x network.

This invention provides a method for realizing the reception of a incoming call number by a terminal in advance, which is applied to a system comprising a Code Division Multiple Access (CDMA) network and a High Rate Packet Data (HRPD) service network, wherein a Mobile service Switching Center (MSC) in the CDMA network connects with an access network in the HRPD network via an interface A1;

when a calling terminal in the CDMA access network initiates a paging to a called terminal in the HRPD network, the method includes:

the MSC in the CDMA network transmitting the incoming call number of the paging to the access network of the HRPD network via the interface A1;

the access network forwarding the incoming call number of the paging to the called terminal;

the called user determining whether to accept the paging based on the received incoming call number, if yes, switching to the CDMA network and receiving the paging, if not, ending the procedure.

Wherein current location area information of terminals of the HRPD network is stored in the MSC of the CDMA network; and before the step of the MSC in the CDMA network transmitting the incoming call number of the paging to the access network of the HRPD network via the interface A1, the method further includes: after receiving a paging, request, the MSC determining the current location of the called terminal based on the stored location area information of the terminal.

After the called terminal receives the incoming call number, the method further includes:

the called terminal returning to the access network a response indicating a successful receiving;

the access network forwarding the response indicating the successful receiving to the MSC via the interface A1;

the MSC sending a ring back tone to the calling terminal after receiving the response indicating the successful receiving.

If the called user determines not to accept the paging, before ending the procedure, the method further includes:

the called terminal returning a message of rejecting the paging to the HRPD network;

the access network forwarding the message to the MSC of the CDMA network via the interface A1;

the MSC returning a message of rejecting the paging to the calling terminal.

The step of the MSC transmitting the incoming call number to the access network includes:

adding a incoming call number field in the paging message beforehand; and transmitting the incoming call number by carrying it in the incoming call number field of the paging message;

or transmitting the incoming call number by carrying it in a user data field of an ADDS Page Message;

or transmitting the incoming call number by carrying it in a newly constructed message used to transmit the incoming call number.

It can be seen from the above schemes that an interface A1 is added between HRPD and CDMA2000 1x according to the invention, to transmit the voice paging message or ADDS paging message carrying the incoming call number from CDMA2000 1x for an MS/AT staying in a HRPD network, accordingly, MS/AT staying in HRPD network can obtain the incoming call number without switching to CDMA2000 1x so that the user can determine whether to accept the incoming call or not. Therefore, when HRPD is processing a packet data service, MS/AT according to the invention can monitor the voice paging message of CDMA2000 1x via HRPD, so as to reduce the frequency for MS/AT to switch to CDMA2000 1x, thereby to ensure the real-time transmission of the packet data service. According to the invention the MS/AT which receives the voice paging can obtain the incoming call number in advance without interrupting the packet data service in HRPD such that the MS/AT does not have to interrupt the packet data service being processed in HRPD if the user does not intend to accept this incoming call.

DETAILED DESCRIPTION OF PREFERRED EMBODIMENTS

The invention is hereinafter described in detail with reference to the accompanying drawings and specific embodiments.

Figure 1:
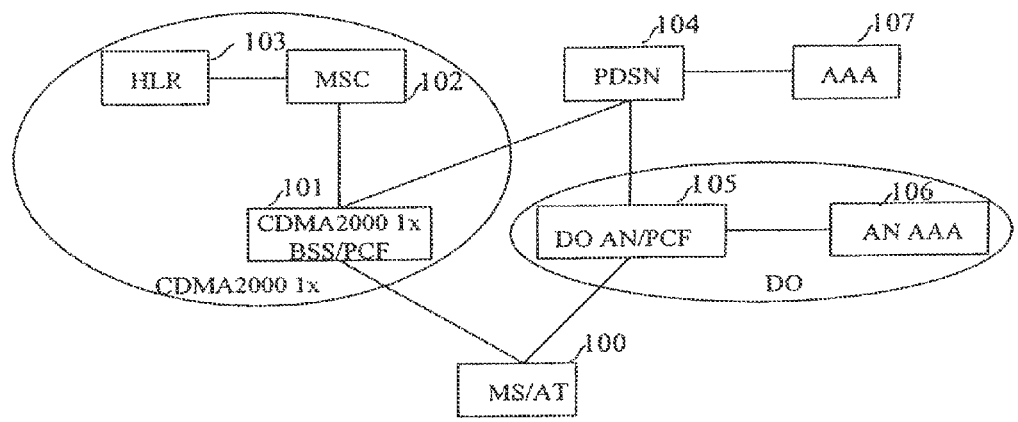
FIG. 1 shows the networking of a CDMA2000 and a HRPD.

According to the embodiment, interface A1 is added between CDMA2000 1x and HRPD based on the network structure shown in FIG. 1 for transmitting the signaling message, such as a paging message and system message.

Figure 2:
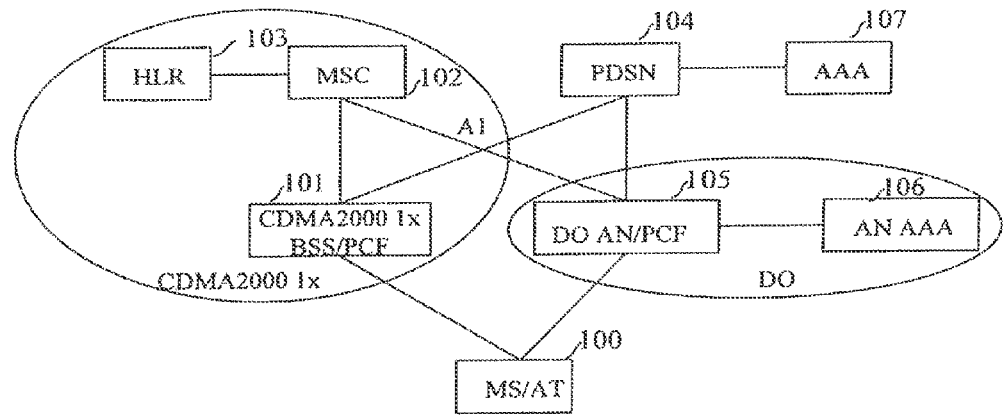
FIG. 2 shows the networking of a CDMA2000 and a HRPD according to an embodiment of the invention.

The networking structure of CDMA2000 1x and HRPD according to a preferred embodiment of the invention is shown in FIG. 2, wherein interface A is added between MSC 102 of CDMA2000 1x and HRPD AN/PCF 105 of HRPD.

At MSC 102, HRPD AN/PCF 105 is managed as a CDMA2000 1x BSS of different frequency. MSC 102 stores the location area information of terminals in HRPD besides the location area information of terminals in CDMA2000 1x, and simultaneously manages the location area information of terminals in both CDMA2000 1x and HRPD network. Meanwhile, in the statically configured data of MSC 102, the data of the Base Station Controller (BSC) of the BSS which connects with MSC 102 are distinguished from the data of HRPD AN/PCF 105 so as to determine whether the currently covered MS/AT 100 belongs at BSC or AN. There are many methods for distinguishing the two types of data, for example, storing the data belonging to BSC and the data belonging to AN/PCF 105, respectively, or setting different identifiers for the data belonging to different networks, and no limit is set to which method should be used in this invention. In addition, the location area information stored it MSC 102 needs to be updated frequently so that accurate location area information of CDMA2000 1x could be carried while forwarding a voice paging message of CDMA2000 1x. No limit is set to the specific updating methods used in the invention for example, scheduled updating may be adopted, i.e., MS/AT 100 reports its own location area information to MSC initiatively or based on the instructions of MSC periodically as scheduled, and then MSC 102 updates its own location area information,; or MS/AT 100 initiatively reports the updated location area information to MSC 102 when MS/AT 100 switches between two networks, and MSC 102 updates its own location area information. For the terminals in the HRPD network, the reported location area information can be transmitted to MSC 102 by DO AN/PCF 105 via A1.

At HRPD AN 105, a processing mechanism for A1 interface message needs to be added.

Based on the above, the information transmitting between MSC 102 and HRPD AN 105 can be realized directly. For example, a voice paging message with the incoming call number in CDMA2000 1x could be transmitted to MS/AT 100 in HRPD via A1 interface. Thus, MS/AT 100 in HRPD don't need to switch to CDMA2000 1x first and set up a traffic channel to obtain the incoming call number. The user can determine whether to accept this incoming call in advance. If the user chooses to accept this incoming call, MS/AT 100 switches to CDMA2000 1x, and sets up a traffic channel to accept this incoming call for the user. If the user chooses not to accept this incoming call, MS/AT 100 directly sends a rejection message to CDMA2000 1x network via the A1 interface without switching to CDMA2000 1x network. Consequently, switching between HRPD and CDMA2000 1x is avoided.

The invention provides two preferred schemes for obtaining the incoming call number in advance.

Scheme 1: The incoming call number is carried in the Paging Request, which enables MS/AT to obtain this paging's incoming call number at the same time when HRPD receives the voice paging message of CDMA2000 1x, accordingly the user may decide whether to accept this incoming call.

The format of a Paging Request which is transmitted via A1 interface in the prior art is shown in table 1.

TABLE 1

| Message Field | Message Transmitting Direction | Type | |
|---|---|---|---|
| Message Type | MSC->BSS of different frequency | M | |
| Mobile Identity (IMSI/ESN) | MSC-> BSS of different frequency | M | |
| Tag | MSC-> BSS of different frequency | O | C |
| Call Identifier List | MSC-> BSS of different frequency | O | C |
| Slot Cycle Index | MSC-> BSS of different frequency | O | C |
| Service Option | MSC-> BSS of different frequency | O | R |
| IS-2000 Mobile Capabilities | MSC-> BSS of different frequency | O | C |

An incoming call number field is further added in the Paging Request shown in table 1 according to an embodiment of the invention, as shown in table 2.

TABLE 2

| Calling Party BCD Number | MSC-> BSS of different frequency | O | C |
|---|---|---|---|

In this way, the MS/AT can obtain the incoming call number of this voice paging according to the incoming call number field when HRPD receives a Paging Request, accordingly the user directly decides whether to accept this incoming call, if the user chooses not to accept this incoming cal, the MS/AT directly rejects this incoming call via HRPD.

Figure 3:
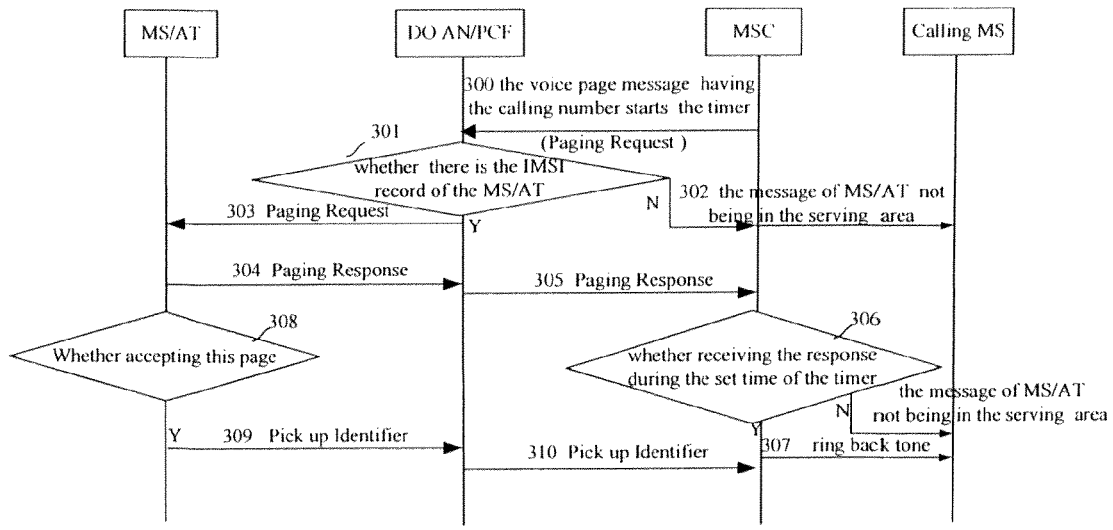
FIG. 3 is the signaling flowchart of the processing when MS/AT receives a voice paging request in a HRPD according to an embodiment of the invention.

FIG. 3 is the signaling flowchart of the processing when MS/AT receives a Paging Request in HRPD according to an embodiment of the invention. The detailed steps are as follows:

Step 300: after MSC of CDMA2000 1x receives a voice paging request, MAC of CDMA2000 1x determines whether the called MS/AT stays in HRPD and is in an activation status in accordance with its own statically configured data, if yes, MSC sends a Paging Request which includes the incoming call number field carrying the incoming call number of the paging MS/AT to HRPD AN/PCF via the A1 interface between HRPD and itself, and meanwhile, starts a timer T3113 in CDMA2000 1x.

Step 301: after receiving this message, HRPD AN/PCF checks the pre-stored records of International Mobile Subscriber Identity (IMSI), and judges whether there is the IMSI record of the called MS/AT, if yes, performs Step 303; if not, performs Step 302.

Step 302: HRPD AN/PCF sends the message that MS/AT is not in the serving area to MSC via the A1 interface between CDMA2000 1x and itself, MSC forwards the message that this user is not in the serving area to the calling user, and this procedure is over.

Step 303: HRPD AN/PCF forwards this Paging Request to the called MS/AT via the forward traffic channel.

Step 304: after receiving this message, MS/AT sends a Paging Response to HRPD AN/PCF via the reverse traffic channel, and performs Step 308.

Step 305: after receiving the Paging Response, HRPD AN/PCF forwards it to MSC.

Step 306: MSC judges whether it has received the Paging Response within the time set by timer T3113, if yes, performs Step 307, if not, MSC sends the message that the called user is not in the serving area to the calling user, and this procedure is over.

Step 307: MSC gives a ring back tone to the calling user.

Step 308: MS/AT determines the calling user of this voice paging according to the incoming call number included in the received Paging Request, the calling user decides whether to accept this incoming call, if yes, performs Step 309; if not, the called terminal returns a message of rejecting this incoming call to HRPD AN/PCF; HRPD AN/PCF forwards this message to MSC via A1 interface, MSC returns the message that the called terminal refuses to accept the call to the calling terminal, and this procedure is over.

Alternatively, if the called user decides not to accept this incoming call in this step, the procedure can be directly ended without returning any message, in this way, the calling terminal can be rejected through the overtime of the timer in MSC.

Step 309: MS/AT sends a Pick up Identifier to HRPD AN/PCF

Step 310: HRPD AN/PCF forwards the Pick up Identifier to MSC, MSC switches MS/AT to CDMA2000 1x in accordance with the prior art, CDMA 2000 1x establishes the traffic channel for MS/AT to accept this incoming call.

The structure of the Pick up Identifier Message is shown as table 3:

TABLE 3

| Message Field | Message Transmitting Orientation | Type |
|---|---|---|
| Message Type | MS ->BSS of different frequency-> MSC | M |
| Pick up Identifier | MS -> BSS of different frequency-> MSC | M |

Wherein the Pick up Identifier field is used to carry the information indicating whether the user accepts the incoming call or not, for example, when the Pick up Identifier is equal to 1, it indicates the user chooses to accept this incoming call, and when the Pick up Identifier is equal to 0, it indicates the user chooses not to accept this incoming call.

Scheme 2: A method for transmitting a incoming call number in advance by adopting application data to transmit ADDS Paging Message is provides in the scheme 2, so that after HRPD receives the voice paging of 1x, MS/AT can obtain the incoming call number immediately without switching to CDMA2000 1x.

The structure of an ADDS Paging Message in prior art is shown as table 4:

TABLE 4

| Message Field | Message Transferring direction | Type | |
|---|---|---|---|
| Message Type | MSC-> BSS of different frequency | M | |
| Mobile Identity (IMSI/ESN) | MSC-> BSS of different frequency | M | |
| ADDS User Part | MSC-> BSS of different frequency | M | |
| Tag | MSC-> BSS of different frequency | O | C |
| Call Identifier List | MSC-> BSS of different frequency | O | C |
| Slot Cycle Index | MSC-> BSS of different frequency | O | C |
| IS-2000 Mobile Capabilities | MSC-> BSS of different frequency | O | C |

Wherein the ADDS User Part field is defined as the user data. The ADDS User Part held in an ADDS Paging Message is used in this invention to carry the it incoming call number of the voice paging.

In order to respond to the ADDS Paging Message, MS/AT must respond to HRPD AN/PCF by an ADDS Paging Ack which is the response message of an ADDS Paging Message. The structure of the ADDS Paging Ack message is shown as table 5:

TABLE 5

| Message Field | Message Transferring direction | Type | |
|---|---|---|---|
| Message Type | BSS of different frequency->MSC | M | |
| Mobile Identity (IMSI/Broadcast Address) | BSS of different frequency->MSC | M | |
| Tag | BSS of different frequency->MSC | O | C |
| Mobile Identity (ESN) | BSS of different frequency->MSC | O | C |
| Cause | BSS of different frequency->MSC | O | C |
| Call Identifier | BSS of different frequency->MSC | O | C |

Wherein the Cause is a standard definition used in the case of transmission failure of an ADDS Paging Message. When Cause=20 H, it indicates a defect in the equipment, when Cause=71 H, it indicates that the incoming call number carried in ADDS is too long to be transmitted in a paging channel.

Figure 4:
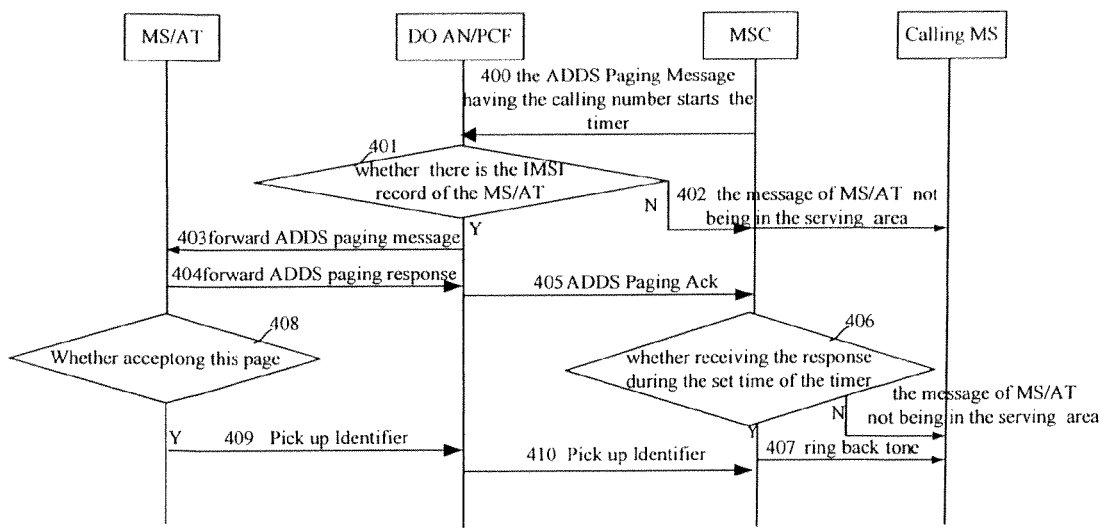
FIG. 4 is the signaling flowchart of the processing when MS/AT receives an ADDS paging message in a HRPD according to an embodiment of the invention.

FIG. 4 is the signaling flowchart of the processing when MS/AT receives an ADDS paging message in HRPD according to an embodiment of the invention. The detailed steps are as follows:

Step 400: after MSC of CDMA2000 1x receives the voice paging request, if MAC determines that the called MS/AT stays in HRPD and is in the activation status according to its own statically configured data, MSC sends a voice paging message to HRPD AN/PCF via HRPD, then sends an ADDS Paging Message carrying the incoming call number of the paging MS/AT to HRPD AN/PCF, and at the same time, CDMA2000 1x starts a timer T3113.

Step 401: alter receiving this message, HRPD AN/PCF checks the pre-stored records of IMSI, and judges whether there is the IMSI record of the called MS/AT, if yes, performs Step 403, if not, performs Step 402.

Step 402: HRPD AN/PCF sends the message that MS/AT of this paging is not in the serving area to the calling user via CDMA2000 1x, and this procedure is over.

Step 403: HRPD AN/PCF sends a forward ADDS paging message carrying the incoming call number of this voice paging to MS/AT via the forward traffic channel.

Step 404: after receiving this message, MS/AT sends a forward ADDS paging response to HRPD AN/PCF via the reverse traffic channel, and performs Step 408 hereinafter.

Step 405: in accordance with the definition of ADDS Paging Message, HRPD AN/PCF begins timing after receiving an ADDS Paging Message. If receiving the forward ADDS paging response sent by MS/AT within the time defined by the ADDS Paging Message, HRPD AN/PCF sends an ADDS Paging Ack indicating that the ADDS Paging Message is transmitted successfully to MSC, the Cause value of this ADDS Paging Ack is set to indicating success, if it is pre-defined that the Cause having an empty value indicates success, the Cause value is empty, and performs Step 406. If not receiving the forward outburst data response within the time defiled by the ADDS Paging Message, HRPD AN/PCF sends an ADDS Paging Ack carrying the Cause value which indicates the failure cause to MSC.

Step 406: MSC judges whether a response indicating the transmission of ADDS Paging Message is successful is received within the time set by timer T3113 or not, if yes, i.e., the ADDS Paging Ack is received within the set time and the Cause value indicates success, performs Step 407; if not, i.e., no ADDS Paging Ack is received within the set time or the Cause value of the received ADDS Paging Ack indicates failure, MSC sends the message that MS/AT of this paging is not in the serving area to the calling user, and this procedure is over.

Step 407: MSC gives a ring back tone to the calling user.

Step 408: MS/AT determines the calling user of this voice paging according to the incoming call number carried in the Paging Request, the calling user decides whether to accept this incoming call or not, if yes, performs Step 409; if not, the called terminal MS/AT returns a message of rejecting this paging to HRPD AN/PCF; HRPD AN/PCF forwards this message to MSC via A1 interface, MSC returns the message of the called terminal refusing to accept the incoming call to the calling terminal, and this procedure is over.

Alternatively, if MS/AT decides not to accept the incoming call in this step, the procedure can be directly ended without returning any message, in this way, the calling user can be rejected through overtime of the timer in MSC.

Step 409: MS/AT sends a Pick up Identifier to HRPD AN/PCF.

Step 410: HRPD AN/PCF forwards the Pick up Identifier to MSC, MSC switches MS/AT to CDMA2000 1x according to the prior art, CDMA2000 1x establishes the traffic channel for MS/AT to accept this incoming call.

The incoming call number can be sent to MS/AT from HRPD via other messages, such as a newly constructed message specially for transmitting the incoming call number, rather than limited to a Paging Request or an ADDS Paging Message.

The invention is applicable to other services besides the voice paging service.

Both DO and HRPD in the invention are high rate packet data service networks, which are just different English designations.

The foregoing is only preferred embodiments of the invention and is not intended to limit the invention. Any modifications, equivalent replacements and improvements within the spirit and principle of the invention should be covered within the protection scope of the invention as set by the appended claims and its equivalents.

What is claimed is:

1. A system for realizing the reception of an incoming call number by a terminal, comprising a Code Division Multiple Access (CDMA) network and a High Rate Packet Data (HRPD) service network which provide service support for the terminal, respectively;
   wherein a Mobile service Switching Center (MSC) in the CDMA network connects with an access network in the HRPD network via an interface A1;
   when a calling terminal in the CDMA network initiates a paging to a called terminal in the HRPD network:
      the MSC in the CDMA network transmits the incoming call number of the paging to the access network of the HRPD network via the interface A1;
      the access network forwards the incoming call number of the paging to the called terminal; and
      the called user determines whether to accept the incoming call based on the received incoming call number, if yes, switch to the CDMA network and receive the paging, if not, end the paging procedure;
   wherein current location area information of terminals of the HRPD network is stored in the MSC of the CDMA network;
   wherein before the MSC in the CDMA network transmitting the incoming call number of the paging to the access network of the HRPD network via the interface A1:
      after receiving a paging request, the MSC determines the current location of the called terminal based on the stored location area information of the terminal; and
   wherein after the called terminal receives the incoming call number:
      the called terminal returns to the access network a response indicating a successful receiving;
      the access network forwards the response indicating the successful receiving to the MSC via the interface A1; and
      the MSC sends a ring back tone to the calling terminal after receiving the response indicating the successful receiving.

2. The system of claim 1, wherein the CDMA network is a CDMA2000 1x network.

3. A method for realizing the reception of an incoming call number by a terminal, which is applied to a system comprising a Code Division Multiple Access (CDMA) network and a High Rate Packet Data (HRPD) service network,
   wherein a Mobile service Switching Center (MSC) in the CDMA network connects with an access network in the HRPD network via an interface A1;
   when a calling terminal in the CDMA network initiates a paging to a called terminal in the HRPD network, the method including:
      the MSC in the CDMA network transmitting the incoming call number of the paging to the access network of the HRPD network via the interface A1;
      the access network forwarding the incoming call number of the paging to the called terminal; and
      the called user determining whether to accept the incoming call based on the received incoming call number, if yes, switching to the CDMA network and receiving the paging, if not, ending the paging procedure;
   wherein current location area information of terminals of the HRPD network is stored in the MSC of the CDMA network;
   wherein before the MSC in the CDMA network transmitting the incoming call number of the paging to the access network of the HRPD network via the interface A1, the method further comprises:
      after receiving a paging request, the MSC determining the current location of the called terminal based on the stored location area information of the terminal; and
   wherein after the called terminal receives the incoming call number, the method further comprises:
      the called terminal returning to the access network a response indicating a successful receiving;
      the access network forwarding the response indicating the successful receiving to the MSC via the interface A1; and
      the MSC sending a ring back tone to the calling terminal after receiving the response indicating the successful receiving.

4. The method of claim 3, if the called user determines not to accept the incoming call according to the incoming call number of the paging, before ending the paging procedure, the method further comprises:
   the called terminal returning a message of rejecting the paging to the HRPD network;
   the access network forwarding the message to the MSC of the CDMA network via the interface A1; and
   the MSC returning a message of rejecting the paging to the calling terminal.

5. The method of claim 3, wherein the step of the MSC transmitting the incoming call number to the access network comprises:
   adding an incoming call number field in the paging message beforehand; and
   transmitting the incoming call number by carrying it in the incoming call number field of the paging message.

6. The method of claim 3, wherein the step of the MSC transmitting the incoming call number to the access network comprises:
   adding an incoming call number field in the paging message beforehand; and
   transmitting the incoming call number by carrying it in a user data field of an ADDS Page Message.

7. The method of claim 3, wherein the step of the MSC transmitting the incoming call number to the access network comprises:
   adding an incoming call number field in the paging message beforehand; and
   transmitting the incoming call number by carrying it in a newly constructed message used to transmit the incoming call number.

* * * * *